United States Patent [19]
Maes et al.

[11] Patent Number: 5,726,239
[45] Date of Patent: Mar. 10, 1998

[54] MONOVINYL AROMATIC BLOCK COPOLYMER CONTAINING COMPOSITIONS AND MICROGRANULES AND POWDERS DERIVED THEREFROM TO BE USED IN ROTATIONAL MOLDING AND SIMILAR PROCESSES

[75] Inventors: Caroline Rita Nicole Maes; Peter Migchels, both of Louvain-la-Neuve, Belgium

[73] Assignee: Shell Oil Company, Houston, Tex.

[21] Appl. No.: 620,778

[22] Filed: Mar. 22, 1996

[51] Int. Cl.$^6$ ........................... C08L 53/02
[52] U.S. Cl. ............ 524/505; 524/490; 525/98; 264/331.13; 264/310
[58] Field of Search ............... 525/98; 524/490, 524/505; 264/310, 331.13

[56] References Cited

U.S. PATENT DOCUMENTS

| | | | |
|---|---|---|---|
| 3,459,831 | 8/1969 | Luftglass | 525/98 |
| 3,678,134 | 7/1972 | Middlebrook | 525/98 |
| 3,865,284 | 2/1975 | Kazama et al. | 223/68 |
| 4,267,080 | 5/1981 | Yokoyama et al. | 260/4 R |
| 4,479,989 | 10/1984 | Mahal | 525/98 |
| 4,868,245 | 9/1989 | Pottick et al. | 525/98 |
| 5,002,997 | 3/1991 | Gelles et al. | 524/505 |
| 5,278,220 | 1/1994 | Vermeire et al. | 524/490 |
| 5,290,837 | 3/1994 | Ghidoni et al. | 524/126 |
| 5,308,700 | 5/1994 | Hikasa et al. | 428/402 |

FOREIGN PATENT DOCUMENTS

| | | | |
|---|---|---|---|
| 0056005 | 1/1982 | European Pat. Off. | C08L 53/00 |
| 0212831 | 7/1986 | European Pat. Off. | C08L 53/00 |
| 308001 | 3/1989 | European Pat. Off. | 525/98 |
| 0452089 | 4/1991 | European Pat. Off. | C08L 53/02 |
| 2337751 | 9/1977 | France | C08L 53/02 |
| 54-120658 | 9/1979 | Japan | 525/98 |
| 58-222143 | 12/1983 | Japan | 525/98 |
| 61-9448 | 1/1986 | Japan | 525/98 |
| 1-174550 | 7/1989 | Japan | 525/98 |
| 1196127 | 9/1967 | United Kingdom | 525/98 |
| 2010862 | 11/1978 | United Kingdom | C08L 25/02 |
| 2021612 | 5/1979 | United Kingdom | C08L 91/00 |
| 2270915 | 9/1993 | United Kingdom | C08L 23/10 |

OTHER PUBLICATIONS

"Micropellets: Little Things Mean a Lot," by James J. Callari, Editor-in-Chief, *Plastics World*, Nov. 1994.

*Primary Examiner*—Ralph H. Dean
*Attorney, Agent, or Firm*—Donald F. Haas

[57] ABSTRACT

Block copolymer containing compositions, to be used in rotational molding, the compositions comprising at least:

(a) 100 parts by weight of a block copolymer containing at least two predominantly poly(monovinyl aromatic) blocks and at least one predominantly poly(conjugated diene) block, the poly(conjugated diene) block preferably being selectively hydrogenated;

(b) from 10 to 80 parts by weight and preferably from 20 to 50 parts by weights, of a linear low density poly (ethylene) or copolymers of predominantly ethylene and minor amounts of other α-olefin comonomers; and (c) from 20 to 100 parts by weight and preferably from 20 to 45 parts by weight of a plasticizer.

13 Claims, No Drawings

MONOVINYL AROMATIC BLOCK COPOLYMER CONTAINING COMPOSITIONS AND MICROGRANULES AND POWDERS DERIVED THEREFROM TO BE USED IN ROTATIONAL MOLDING AND SIMILAR PROCESSES

FIELD OF THE INVENTION

The present invention is relating to monovinylaromatic block copolymer containing compositions and microgranules and powders derived therefrom, to be used in rotational molding and similar processes. More in particular the present invention is relating to compositions, comprising block copolymers of at least one monovinyl aromatic monomer such as styrene and at least one conjugated diene such as 1,3-butadiene, and to microgranules and powders derived therefrom.

BACKGROUND OF THE INVENTION

Rotational molding processes, using as starting materials elastomer containing compositions, were known from e.g. U.S. Pat. Nos. 5,308,700; 4,267,080 and 3,865,284.

U.S. Pat. No. 3,865,284 actually disclosed a dress form comprising a layered wall having the external form of a human torso and having an outer cellular layer and integral thereto an inner cellular layer; said outer cellular layer having an expansion ratio of from 2 to 20 and comprising a thermoplastic polymeric material, having an elastic modulus of 500 to 10 kg/cm² and preferably selected from the group consisting of ethylene-vinyl acetate copolymers ethylene-acrylate copolymers and ethylene methacrylate copolymers; and (b) said inner layer comprising a thermoplastic polymeric material having a Young's modulus of 2,000 to 50,000 kg/cm².

Said dress form was mentioned to have been prepared by rotational molding, using an expandable thermoplastic resin powder for the outer layer, having a preferred size from 70 to 400μ and containing a blowing agent, having a higher decomposition temperature than the melting point or softening point of the polymeric material; and expandable thermoplastic polymeric beads or pellets, containing a blowing agent having a higher decomposition temperature than the melting point or softening point of said polymeric material. A mixture of said powder and beads or pellets was charged into a mold and the mold was rotated in an atmosphere heated at a temperature higher than the decomposition temperatures of the blowing agents. The heating caused that the powder, having a smaller particle size melts into a molten layer on the inner wall of the mold, and the bead or pellet, having a relatively larger particle size, melts and adheres to the inner surface of the molten layer of the powder to form an inner molten layer.

Thereafter foaming took place in both molten layers by decomposition of the blowing agents.

From U.S. Pat. No. 4,267,080 it was known to produce articles of polymers of ethylene, having incorporated therein (1) 5–50 parts by weight of a rubber and/or an elastomer based on 100 parts by weight of the ethylene polymers, and in particular styrene-butadiene block copolymer elastomer, 2) a crosslinking agent selected from bis(tert-alkylperoxy) alkane or bis(tert alkylperoxy) benzene, and (3) 0.5–5 times by weight the amount of crosslinking agent specified under (2) of at least one crosslinking aid selected from 1,2-polybutadiene, triallyl cyanurate and triallyl isocyanurate; by rotational molding.

Such molded articles were indicated to show good release characteristics as well as high impact strength and attractive surface luster.

The amount of the elastomer was prescribed to be in the range of from 5 to 50 parts by weight and preferably from 10 to 30 parts by weight per 100 parts by weight of the ethylene polymer.

U.S. Pat. No. 5,308,700 disclosed a thermoplastic elastomer powder for powder molding, comprising a partially crosslinked type elastomer composition, from comprising a mixture of an ethylene-α-olefin copolymer rubber and a polyolefin resin, dynamically crosslinked in the presence of a crosslinking agent, wherein said elastomer composition has a complex dynamic viscosity η* (1) as measured at frequency of 1 radian/sec in dynamic viscoelasticity measurement at 250° C., of 1.5×10⁵ poise or less, a Newtonian viscosity index n calculated from the following equation by using the complex dynamic viscosity η*(1) at a frequency of 1 radian/sec and the complex dynamic viscosity η* (100) at a frequency of 100 radian/sec of 0.67 or less and a hardness (shore D) of 45 or less:

$$n=\{\log \eta^*(1)-\log \eta^*(100)\}/2$$

As ethylene-α-olefin copolymer rubber preferably ethylene-propylene-non conjugated diene copolymer rubber was used, while the polyolefin resin component of the powder was polypropylene or a copolymer of propylene and an α-olefin. No reference was made to styrenic block copolymers at all.

The hereinbefore discussed publications have all in common, that a thermoplastic material in the form of very fine powder having a particle size of 300 μm is used for rotational molding, wherein a fused thermoplastic material flows and spreads to form a fused thermoplastic layer on the inner surface of a mold. Moreover in order to reach a thermoplastic material of enhanced flow characteristics low molecular weight materials had to be used which provided rotational molded articles being poor in impact strength and environmental stress cracking resistance, and thus in service life.

It was generally known that particle sizes of starting powder for such processes, derived from low melt viscosity styrenic block copolymer containing compositions, of lower than 400 μm could be obtained by cryogenic milling at temperatures of −40° C. or lower and preferably −70° C. or lower, and that a dusting agent had to be added to said powder in order to reach powder compositions of a sufficiently good flow behaviour under a low shear rate and low pressure, i.e. powder compositions which do not block or cake by uncontrolled reagglomeration during storage and processing.

However, there has developed a strong need to avoid the use of such dusting agents, due to environmetal or health risks and/or additional costs.

Rotational moulding can be regarded as one of the oldest and simplest thermoplastic processing techniques in the polymer industry.

Such rotational molding process normally consists of three steps and distinguishes a loading/unloading station, a heating station and a cooling station.

A cold mold was up to now filled with a measured weight of a thermoplastic powder (station 1). Then the mold was moved into an oven (station 2) and started to rotate biaxially at a low speed (from 2–20 rpm). The powder in contact with the hot inner surface of the mold fused and adhered to the mold surface, finally producing an even coating over the inside of the mold. After fusion had been completed the mold was moved into a cooling chamber (station 3) to be cooled by air or water jet. Subsequently the mold was returned to its original position (station 1) where the article was removed as soon as its shape was sufficiently stable.

Therefore, it was an object of the present invention to improve the properties of products of rotational molding and similar process, while a decrease of the product price is also desired.

As a result of extensive research and experimentation styrenic block copolymer compositions which meet the processing requirements as specified hereinbefore, surprisingly were found.

SUMMARY OF THE INVENTION

Accordingly, the present invention is relating to monovinylaromatic block copolymer containing compositions which are to be used in rotational molding and are comprising at least:

(a) 100 parts by weight of a main block copolymer containing at least two predominantly poly(monovinyl aromatic) blocks and at least one predominantly poly(conjugated diene) block, the poly(conjugated diene) block of which optionally being selectively hydrogenated.

(b) from 10 to 80 parts by weight and preferably from 20 to 50 parts by weights, of a linear low density poly(ethylene) or copolymers of predominantly ethylene and minor amounts of other α-olefin comonomers.

(c) from 20 to 100 parts by weight and preferably from 20 to 45 parts by weight of a plasticizer.

The block copolymers to be used as component (a) may be linear triblock copolymers or multiarmed or star shaped symmetrical or unsymmetrical block copolymers as main ingredient. It will be appreciated that these block copolymers may be optionally mixed with relatively small amounts of diblock copolymers (<20 wt %) relative to the block copolymer weight, which served as initially prepared, intermediate living block copolymers which were coupled into the triblock copolymers or multiarmed or star shaped block copolymers.

DETAILED DESCRIPTION OF THE INVENTION

The present invention is monovinylaromatic block copolymer containing compositions which are to be used in rotational molding or similar processes and are comprising at least:

(a) 100 parts by weight of a main block copolymer containing at least two predominantly poly(monovinyl aromatic) blocks and at least one predominantly poly(conjugated diene) block, the poly(conjugated diene) block of which optionally being selectively hydrogenated (b) from 10 to 80 parts by weight and preferably from 20 to 50 parts by weights, of a linear low density poly(ethylene) or copolymers of predominantly ethylene and minor amounts of other α-olefin comonomers.

(c) from 20 to 100 parts by weight and preferably from 20 to 45 parts by weight of a plasticizer.

The block copolymers to be used as component (a) may be linear triblock copolymers or multiarmed or star shaped symmetrical or unsymmetrical block copolymers as main ingredient. It will be appreciated that these block copolymers may be optionally mixed with relatively small amounts of diblock copolymers (<20 wt %) relative to the block copolymer weight, which served as initially prepared, intermediate living block copolymers which were coupled into the triblock copolymers or multiarmed or star shaped block copolymers.

It has been found that suitable block copolymer containing compositions to be successfully applied in rotational molding, preferably show melt viscosity at low shear of a value lower than 2000 Pa.s at 190° C.

The poly(conjugated diene) blocks may optionally have been hydrogenated up to a substantial degree, i.e. more than 80% of the original ethylenic unsaturation has been hydrogenated.

According to a preferred embodiment of the present invention, the poly(conjugated diene) blocks have been hydrogenated up to a residual ethylenic unsaturation (RU) of at most 10% and more preferably less than 5%.

With the term "predominantly derived from" is meant that the main monomer of the respective individual blocks optionally may be mixed with minor amounts of another comonomer and more in particular with minor amounts of the main monomer of the other blocks.

Examples of the mono vinyl aromatic monomers may be selected from styrene, α-methylstyrene, p-methylstyrene, m-methylstyrene, o-methylstyrene, p-tert-butylstyrene, dimethylstyrene, vinylnaphthalene and the like and mixtures thereof and conjugated diene monomers may be selected from butadiene, isoprene, 2-ethyl-1,3 butadiene 2,3 dimethyl-1,3-butadiene 1,3-pentadiene, 2,4-hexadiene, 3-ethyl 1,3-pentadiene and the like, and mixtures thereof.

Of these monomers styrene and butadiene or isoprene or mixtures thereof are preferred. Most preferably block copolymers have been found to be used, which only contain substantially pure poly(styrene) blocks and substantially pure poly(butadiene) or poly(isoprene) blocks.

Examples of such block copolymers which can be suitably used are KRATON® D and G block copolymers (KRATON is a trade mark of Shell Chemical Company) and more preferably KRATON® D 1118, KRATON® D 1102, KRATON® D 4271, KRATON® G 1652, KRATON® G 1726 block copolymers are used.

It will be appreciated that also mixtures of hydrogenated and non-hydrogenated or partially hydrogenated block copolymers can be used as starting ingredients for the block copolymer composition, in addition to individual grades of hydrogenated block copolymers or non-hydrogenated block copolymers or partially hydrogenated block copolymers. However, the use of block copolymers, having poly(conjugated diene) blocks which have been substantially hydrogenated (RU ≦5%) is preferred.

The terminal poly(monovinyl aromatic) blocks in the optionally selectively hydrogenated block copolymers have usually apparent number average molecular weights, ranging from 3,000 to 100,000 and preferably from 5,000 to 20,000, and the internal, optionally selectively hydrogenated poly(conjugated diene) blocks usually have apparent number average molecular weights in the range of from 10,000 to 300,000 and preferably from 30,000 to 100,000. The initially prepared poly(conjugated diene) blocks usually contain from 5 to 50 mol %, relative to the conjugated diene molecules, of vinyl groups originating from 1,2-polymerization and more preferably from 5 to 15% in case of use of non-hydrogenated block copolymers and from 25–40% in case of use substantially completely hydrogenated block copolymers.

The complete block copolymer to be used according to the present invention, is normally containing bound monovinyl aromatic in an amount of from 20 to 60% by weight and preferably from 25 to 45% by weight. The apparent number average molecular weight of the total block copolymer will normally be in the range of from 20,000 to 350,000 and preferably in the range of from 40,000 to 200,000 and more preferably in the range from 40,000 to 150,000.

Apparent number average molecular weights are calculated by dividing the amount of each monomer charged to the reactor by the moles of living molecules used to polymerize the monomer. This measurement corresponds closely to measured number average molecular weights for monomer blocks and linear polymers. The total molecular weight of star polymers depends on the degree of coupling and is usually determined by measurement such as by GPC analysis using light scattering techniques.

As component (b) linear low density poly(ethylene) or copolymers of predominantly ethylene and minor amounts of other comonomer grades may be used, which have a melt index (measured according to ASTM D 1238 in the range of from 5 to 75 and preferably from 20 to 75 , and a density in the range of from 0.91 to 0.95 g/cm$^3$.

As component (c) various plasticizing oils are useful in the compositions to be used according to the present invention.

Plasticizing oils which have been found useful include petroleum derived oils, olefin oligomers and low molecular weight polymers, as well as vegetable and animal oil and their derivatives.

The petroleum derived oils which may be employed are relatively high boiling materials, containing only a minor proportion of aromatic hydrocarbons preferably less than 20 percent and more preferably less than 15 percent by weight of the oil most preferably the oil may be totally non-aromatic. The oligomers may be polypropylene, polybutenes, hydrogenated polyisoprene, hydrogenated polybutadiene, polypiperylene and copolymers of piperylene and isoprene, having average molecular weights between 350 and 10,000.

Vegetable and animal oils include glyceryl esters of the usual fatty acids and polymerization products thereof.

Examples of a preferred paraffinic oil are PRIMOL 352 (PRIMOL is a trade mark) CATENEX SM 925, CATENEX SM 956 (CATENEX is trade mark) and the NAPVIS and HYVIS (trade marks) polyolefins, having a molecular weight in the range of from 500 to 6,000.

The block copolymer containing compositions may contain in addition to the components (a)–(c) minor amounts of one or more usual auxiliaries, such as blowing agents, stabilizers, antistatic agents, and mold release agents.

The hereinbefore specified styrenic block copolymer containing compositions can be used in the form of particles, having an average size in the range of from 200 to 1100 μm.

The average particle size D$_m$ is calculated according to the equation $$D_m = \Sigma(Pi \times Di/100)$$

wherein

Pi=the weight percentage of the material retained on sieve i.

Di=average particle size in microns of material on sieve i.

Preferably the average particle sizes are in the range of from 200 μm to 800 μm and more preferably from 300 to 700 μm.

It will be appreciated that a preferred embodiment of the present invention is formed by microgranules, having an average particle size of from 300 to 1100 μm, and preferably from 300 to 900 μm and more preferably from 500–700 μm and derived from the hereinbefore specified block copolymer compositions.

Another aspect of the present invention is formed by a process for the manufacture of microgranules, having an average particle size of from 300 to 1100 μm.

Said process comprises feeding the respective ingredients at the same or different places into an extruder, extrusion of the homogeneous melt through a die with micro holes and subsequent pelletizing resulting in microgranules with an hereinbefore specified average particle size. Such a process was known in principle from e.g. Plastics World, November 1994, page 20, "Micropellets:Little things means a lot", J. J. Callari.

It will be appreciated that a surprising advantageous aspect of the present invention is formed by the found enablement to use said microgranules for fusing them at very low or zero shear by applying heat, allowing the use of processing techniques such as rotational molding, to convert the microgranules into elastomeric layers with a broad range of properties instead of the conventional fine powder compositions which are significantly more expensive due to higher manufacturing costs.

Another aspect of the present invention is formed by a specific process for the manufacture of formed articles by rotational molding of the hereinbefore specified particles of the block copolymer composition.

Specific oven temperatures which provided formed articles of an acceptable quality are in the range of from 260° to 300° C. and preferably in the range of from 260° to 280° C., while the maximum internal air temperature is in the range of from 170° to 225° C. and preferably from 190° C. to 215° C., using an aluminium mould thickness of from 5 to 10 mm, a moulded part thickness of from 0.5 to 3 mm while the mould may be internally coated to enable the easy release of the product ROTOSPEED or CACCIA (trademarks) equipment can be suitably applied.

The invention is further illustrated by the following examples, however without restricting its scope to these specific embodiments.

EXAMPLE 1

A preblend was prepared in a PAPENMEIER (trademark) dry blender from the ingredients listed in the following Table 1, and subsequently compounded on a WERNER and PFLEIDERER (trademark) twin screw extruder. The extruded polymer strands were granulated with a WERNER und PFLEIDERER face die cutter. The processing parameters have been listed in Table 2. To measure the mechanical properties, dumbbells were injection molded from the compound granules on a BATTENFELD injection molding machine. Molding parameters are listed in Table 3. Prior to testing, all samples were conditioned for 24 hours at 23° C. and 50% relative humidity.

Tensile properties were measured according to ISO-37. Shore A hardness was measured according to ISO-868. The hardness was measured after 0 and 30 seconds indentation.

The flexural modulus was determined according to ISO-178.

All mechanical properties were measured in fivefold and average values have been listed in Table 4.

TABLE 1

| Trade Name | Description and Supplier | parts by weight |
| --- | --- | --- |
| KRATON G-1652 | S-E/B-S block copolymer, 29% PSC, SHELL | 100 |
| LL 6201 XR | Linear low density polyethylene MFR 50 EXXON Chemical | 20 |
| CATENEX SM 925 | Paraffinic oil, SHELL | 40 |

TABLE 1-continued

| Trade Name | Description and Supplier | parts by weight |
|---|---|---|
| Irganox 1010 | Hindered phenolic antioxidant, CIBA GEIGY | 0.5 |

TABLE 2

Extrusion conditions

| | |
|---|---|
| Compounding extruder | WERNER und PFLEIDERER ZSK 25 |
| Feeding | Schenk Multifeed 2001 loss-in-weight |
| Screw characteristics | double, co-rotating, 25 mm, L/D 49 |
| Screw speed | 400 rpm |
| Die characteristics | 2 strands, 4 mm diameter |
| Die pressure | 11–44 bar |
| Output | 10–20 kg/h |

TABLE 3

Injection moulding conditions

| | |
|---|---|
| Injection moulding machine | Battenfeld |
| Screw diameter | 22 mm |
| Melt temperature | 185° C. |
| Mold temperature | 30° C. |
| Max. injection pressure | 70 bar |
| Follow-up pressure | 35–45 bar |
| Follow-up pressure time | 8–15 sec |
| Cooling time | 15–30 sec |

From the granules as described hereinbefore a fine powder was prepared, by passing them, via a conveying screw in an insulated chamber cooled down to −35° C. through a mill wherein the milling was performed at a throughput of 42 kg/h. Moisture content of the powder after milling was 0.5 wt %. The particle size distribution (ASTM D 1921) have been listed in Table 5.

To optimize the flow behavior of the powder different amounts of Aerosil 200, a dusting or free-flow agent, were added. Of these mixtures the flow behavior was tested by determining (3 measurements per sample) the time needed for 150 g of powder to flow out of a funnel with a 9 mm orifice (ASTM D 1895A) as listed in Table 6.

The obtained powder composition was subjected to rotational molding processing, the details of which have been listed in Table 10 and 11.

TABLE 4

| | | |
|---|---|---|
| Shore A | 0 s | 67 |
| | 30 s | 65 |
| Flex. Mod. | MPa | 44 |
| Tens. strength | MPa | 6.0 |
| Elongation at break | % | 480 |
| MFR (190° C./2.16 kg) | g/10 min | 14 |

TABLE 5

Particle size distribution of the milled compound (ASTM D 1921):

| | |
|---|---|
| <400 µm | 99% |
| <300 µm | 97% |

TABLE 5-continued

Particle size distribution of the milled compound (ASTM D 1921):

| | |
|---|---|
| <200 µm | 65% |
| <100 µm | 5% |

TABLE 6

| % w Aerosil 200 | flow behavior |
|---|---|
| 0 | 1. no flow |
| | 2. no flow |
| | 3. no flow |
| 0.2 | 1. no flow |
| | 2. no flow |
| | 3. no flow |
| 0.5 | 1. 55 seconds after tap |
| | 2. no flow |
| | 3. 61 seconds after trap |
| 0.7 | 1. 40 seconds |
| | 2. 38 seconds |
| | 3. 38 seconds |
| 1 | 1. 40 seconds |
| | 2. 40 seconds |
| | 3. 40 seconds |

EXAMPLE 2

A preblend was prepared in a PAPENMEIER dry blender from the ingredients listed in Table 7. The blend was extruded through a die with circular holes having a diameter in the range of from 360 to 500µm in an underwater pelletizer, processing parameters which have been listed in Table 8, and providing microgranules, having a particle size distribution as listed in Table 9. The obtained microgranule composition was subjected to rotational molding processing, the details of which have been listed in Tables 10 and 11. Good parts were formed in several well rounded molds.

TABLE 7

| Trade name | Description and Supplier | parts by weight |
|---|---|---|
| KRATON D 4271 | S-B-S block copolymer pSc 45%, SHELL | 100 |
| TPS 476 | Toughened Polystyrene, BASF | 5 |
| EZL 675 | Paraffinic Oil, EXXON | 30 |
| IRGANOX 565 | Hindered phenolic antioxidant CIBA-GEIGY | 0.1 |
| TINUVIN B | UV-stabiliser — CIBA GEIGY | 0.3 |

TABLE 8

Extruder settings
APV twin screw extruder, 65 mm

| | | |
|---|---|---|
| Barrel temperatures | °C. | 50–40 |
| Die temperature | °C. | 200 |
| Die pressure | bar | 48–79 |
| Throughput | kg/h | 100–150 |
| Extruder screw speed | rpm | 500 |
| Granulator shaft speed | rpm | 3600 |
| Die set-up | | 240 × 0.5 mm holes |
| Granulator water temperature | °C. | 55–65 |
| Number of granulating knives | | 6 |

TABLE 9

| Micropellets paricle size distribution ASTM D 1921 | |
|---|---|
| | 91.263 % w |
| >2000 µm | 0.5 |
| >1180 µm | 30.7 |
| >710 µm | 68.8 |
| >300 µm | 0 |

TABLE 10

| Equipment Characteristics | | |
|---|---|---|
| | ROTOSPEED | CACCIA |
| Oven temperature (°C.) | 270 | 270 |
| Fan Speed | 3000 | |
| Cooling | air only | air only |
| mold | Bladder | Test mold |
| Shotweight (g) | 400/300 | 1000 |

TABLE 11

| Molding conditions | | |
|---|---|---|
| | Composition Example 1 | Composition Example 2 |
| oven temperature | 270° C. | 270° |
| mold thickness | 8–10 mm alum | 8–10 mm alum |
| part thickness | ≈2.5 mm | ≈2.5 mm |
| maximum internal air temperature | 215–220° C. | 205–210° C. |

We claim:

1. Block copolymer containing compositions, for use in rotational molding which have a low shear melt viscosity less than 2000 Pa.s at 190° C. and are in the form of powder with a particle size of less than 400 µm or microgranules with a particle size of 200 to 1100 µm, comprising at least:
   100 parts by weight of a main block copolymer containing at least two predominantly poly(monovinyl aromatic) blocks and at least one predominantly poly(conjugated diene) block, the poly(conjugated diene) block of which optionally being selectively hydrogenated;
   from 10 to 80 parts by weight of a linear low density poly(ethylene) or copolymers of predominantly ethylene and minor amounts of other α-olefin comonomers; and
   from 20 to 100 parts by weight of a plasticizer.

2. The block copolymer containing compositions according to claim 1, wherein the block copolymers are derived from styrene and butadiene or styrene and isoprene.

3. The block copolymer containing compositions according to claim 1, wherein the poly(conjugated diene) blocks have been hydrogenated up to a residual ethylenic unsaturation (RU) of at most 10%.

4. The block copolymer containing compositions according to claim 1, wherein the poly(conjugated diene) blocks have been hydrogenated up to a residual ethylenic unsaturation of less than 5%.

5. The block copolymer containing compositions according to claim 1, wherein the poly(monovinyl aromatic) blocks have apparent number average molecular weights in the range of from 5,000 to 20,000.

6. The block copolymer containing compositions according to claim 1, wherein the poly(conjugated diene) blocks have apparent number average molecular weights in the range of from 30,000 to 100,000.

7. The block copolymer containing compositions according to claim 4, wherein the poly(conjugated diene) blocks have 1,2-addition in the range of from 5 to 50%.

8. The block copolymer containing compositions according to claim 1, wherein the block copolymer has a bound vinyl aromatic content in the range of from 25 to 45% by weight.

9. The block copolymer containing compositions according to claim 1, wherein the composition comprises from 20 to 50 parts by weight of the linear low density poly(ethylene) or copolymer of ethylene and other comonomers grades, and the poly(ethylene) or copolymer of ethylene have a melt index (ASTM D 1238) in the range of from 5 to 75 and a density in the range of from 0.91 to 0.95 g/cm$^3$.

10. The block copolymer containing compositions according to claim 1, wherein the average size of particles is in the range of from 300 µm to 900 µm.

11. The block copolymer containing compositions of claim 1, wherein the composition comprises from 20 to 45 parts by weight of the plasticizer.

12. A process for making molded articles comprising the steps of:
   making a block copolymer composition having a low shear melt viscosity less than 2000 Pa.s at 190° C. by blending 100 parts by weight of a main block copolymer containing at least two predominantly poly(monovinyl aromatic) blocks and at least one predominantly poly(conjugated diene) block, the poly(conjugated diene) block of which optionally being selectively hydrogenated, from 10 to 80 parts by weight of a linear low density poly(ethylene) or copolymers of predominantly ethylene and minor amounts of other α-olefin comonomers, and from 20 to 100 parts by weight of a plasticizer wherein said composition is further processed to create powder with a particle size of 400 µm or microgranules with a particle size of 200 to 1100 µm; and
   injecting said block copolymer containing composition into a rotational mold; and
   rotationally molding the block copolymer containing composition into the article.

13. The process of claim 13, wherein the block copolymer containing composition is rotationally molded at a maximum internal air temperature within the rotational mold in the range of from 170° to 225° C.

* * * * *